United States Patent Office 3,478,073
Patented Nov. 11, 1969

3,478,073
PREPARATION OF ANHYDROUS FERROUS FUMARATE
Thore Oskar Verner Rydh, Sodertalje, Sweden, assignor to Aktiebolaget Astra, Sodertalje, Sweden
No Drawing. Filed Apr. 25, 1967, Ser. No. 633,424
Claims priority, application Sweden, May 6, 1966, 6,263/66
Int. Cl. C07f *15/02*
U.S. Cl. 260—439        1 Claim

ABSTRACT OF THE DISCLOSURE

A method for the preparation of crystalline anhydrous ferrous fumarate which possesses the physical properties of uniform particle size substantially below $5\mu$, solubility in acid medium and low hydroscopicity and moisture content wherein an air-free suspension of ferrous hydroxide is reacted with a slight excess of fumaric acid in an aqueous medium at a temperature exceeding about 70° C., and crystalline anhydrous ferrous fumarate is directly formed and separated from the aqueous medium.

---

The present invention relates to anhydrous ferrous fumarate and its preparation. Said compound possesses valuable properties and is frequently used in the treatment of certain anemia.

By one of the processes of production hitherto known (Swedish Patent No. 178,965) anhydrous ferrous fumarate is prepared by mixing a water-soluble ferrous salt and a water-soluble salt of fumaric acid in aqueous medium at a temperature over about 70° C.

By another known process (Belgian Patent No. 658,067) reduced iron (metallic) and excess fumaric acid are heated in aqueous medium under exclusion of air.

Anhydrous ferrous fumarate is of crystalline structure and is only slightly soluble in water at neutral pH, but is more easily dissolved in acid media as for instance the gastric juice. The rate at which the crystals are dissolved depends on such factors as the particle size and the particle form.

Since iron salts are resorbed at an early stage of the passage through the intestinal canal, the dissolution of the crystals in the stomach should be rapid. For this reason small particles of a uniform size are wanted.

The moisture content and the hygroscopicity must be low, because an increase in the moisture content facilitates the oxidation of ferrous ions, and, moreover, ferrous fumarate is often used in preparations also containing substances which are susceptible to moisture.

When preparing chewing-dragées, substances containing particles sized less than about $50\mu$ are wanted because otherwise one gets the sensation of chewing sand when chewing the dragées. For the preparation of chewing dragées containing anhydrous ferrous fumarate a so-called micronized quality is used, which is obtained by grinding.

The heat evolution generated by the grinding, however, means an increased tendency to formation of ferric ions.

It has now been found that anhydrous ferrous fumarate can be obtained directly (without grinding) as uniform, small particles which are readily soluble in acid media and have a low moisture content combined with low hydroscopicity, if, according to the present invention, ferrous hydroxide and fumaric acid are reacted in an aqueous medium at a temperature over about 70° C. and the formed ferrous fumarate is separated from the aqueous medium.

Preferably a slight excess of fumaric acid is added to an air-free suspension of ferrous hydroxide in an aqueous medium. Deficit of fumaric acid results in unreacted ferrous hydroxide, the presence of which renders the separation of the product more difficult. It also results in an increased content of $Fe^{3+}$ and should accordingly be avoided.

The present invention is further illustrated by the following example.

EXAMPLE I 63.8 g. (0.550 mole) of fumaric acid were added while stirring in small portions over a period of about 30 minutes to an air-free suspension of 0.515 mole of ferrous hydroxide in 700 ml. of water at a temperature of 95 to 100° C. The substance thus formed was filtered off hot and washed with 200 ml. of water at about 50° C. The product was dried overnight at 105° C. 80.7 g. of anhydrous ferrous fumarate were obtained (92.4% yield).

*Analysis.*—Found: $Fe^{3+}$, 1.1%; $Fe^{2+}$, 31.8%; moisture, 0.1%.

The suspension of ferrous hydroxide was prepared in situ by adding while stirring 42.5 g. of 97% NaOH (1.03 mole) dissolved in 100 ml. of water to a solution of 143 g. (0.515 mole) of ferrous sulphate

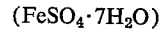

in 600 ml. of water at 95° C. from which air was driven off by nitrogen at 90–100° C. The sodium hydroxide solution was added over a period of 20 minutes.

The product obtained according to Example I was compared to products obtained by the known methods as is recorded below.

A—The product obtained according to Example I.
B—A product according to Example 2 in Swedish Patent No. 178,965 prepared in laboratory.
C—A product according to Example I in Swedish Patent No. 178,965 prepared in laboratory.
D—Commercial quality from source I.
E—Same as D but micronized.
F—Commercial quality from source II.

The particle size was estimated by using a microscope. The result was as follows:

Substance A: This product was found to be more fine-grained than the others, the particles being deemed to belong to one single population of $2–5\mu$ with only a few particles sized about $15\mu$.

Substance B: Two populations, one of 2–5µ and one of 10–40µ.

Substance C: The main part of the particles was sized 20–60µ and a minor part was sized 2–5µ.

Substance D and F: About 95% by weight of the product were estimated to consist of particles sized 20–60µ. A few particles were sized about 5µ.

Substance E: Two populations, one of 1–5µ and one of 10–20µ, both pouulations being comparatively large.

The moisture content was estimated by drying at 105° C. to constant weight. The increase in moisture was measured after storing the substance for 60 and 120 hours at 52, 64, and 75% relative humidity (RH) and room temperature. The result is given in Table 1.

TABLE 1

| Substance: | Percent RH | Increase in moisture content in percent by weight after— | | Original moisture content percent by weight |
|---|---|---|---|---|
| | | 60 hours | 120 hours | |
| A | 52 | 0.310 | 0.349 | 0.542 |
| | 64 | 0.399 | 0.423 | |
| | 75 | 0.467 | 0.478 | |
| B | 52 | 1.64 | 1.80 | 0.350 |
| | 64 | 2.65 | 2.70 | |
| | 75 | 2.91 | 2.97 | |
| C | 52 | 0.474 | 0.521 | 0.215 |
| | 64 | 0.698 | 0.718 | |
| | 75 | 0.778 | 0.818 | |
| D | 52 | 0.106 | 0.127 | 0.344 |
| | 64 | 0.219 | 0.232 | |
| | 75 | 0.287 | 0.306 | |
| E | 64 | 0.374 | 0.372 | 0.515 |
| F | 52 | 0.903 | 0.898 | 1.18 |
| | 64 | 1.02 | 1.00 | |
| | 75 | 1.03 | 1.03 | |

The rate of dissolution was studied by using a pH-state (Radiometer: Titrigraf SBR 2c, Titrator TTT I). 10.0±0.3 g. of ferrous fumarate were suspended in 15 ml. of water and stirred with constant intensiveness at constant pH (2.5) and temperature (23±1° C.). pH was held at 2.5 by addition of 0.1 n $H_2SO_4$ and the consumption of acid as a function of the time was registered. The result is given in Table 2.

TABLE 2

| Substance: | Time required for dissolving 50% of substance minutes | Time required for dissolving 95% of substance minutes | Percent substance dissolved after 25 minutes |
|---|---|---|---|
| A | 1.8 | 8.2 | 100 |
| B | 4.1 | >25 | 89 |
| C | 11 | >25 | 93 |
| D | 17 | >25 | 71 |
| E | 11 | >25 | 80 |
| F | 5 | 12 | 100 |

As is seen a low moisture content and a low hygroscopicity is combined with a small particle size and a rapid dissolution in acid media only in the product obtained by the process according to the present invention.

What is claimed is:

1. A process for the preparation of crystalline anhydrous ferrous fumarate of a particle size substantially below 5µ which comprises reacting an air-free suspension of ferrous hydroxide with a slight excess of fumaric acid in aqueous medium at a temperature exceeding about 70° C. and subsequently separating the anhydrous ferrous fumarate in crystalline form from said aqueous medium.

References Cited

UNITED STATES PATENTS 2,848,366  8/1958  Bertsch et al. _____ 167—68

FOREIGN PATENTS 1,432,757  2/1966  France.

OTHER REFERENCES

Brewster, Organic Chemistry, Prentice-Hall, Inc., New York, N.Y., 1948, p. 321.

TOBIAS E. LEVOW, Primary Examiner

A. P. DEMERS, Assistant Examiner

U.S. Cl. X.R.

260—999